United States Patent
Wang et al.

(10) Patent No.: US 11,002,398 B2
(45) Date of Patent: May 11, 2021

(54) TRENCHLESS REHABILITATION SYSTEM FOR DEFORMATION OF LARGE DIAMETER HDPE PIPELINES AND METHOD THEREOF

(71) Applicants: WELEAD Infrastructure Engineering Technology (Zhengzhou), Ltd., Henan (CN); SAFEKEY Engineering Technology (Zhengzhou), Ltd., Henan (CN)

(72) Inventors: Fuming Wang, Henan (CN); Hongyuan Fang, Henan (CN); Peng Zhao, Henan (CN); Yanhui Pan, Henan (CN); Bin Li, Henan (CN); Hang He, Zhengzhou (CN)

(73) Assignees: WELEAD infrastructure Engineering Technology (Zhengzhou), Ltd., Henan (CN); SAFEKEY Engineering Technology (Zhengzhou), Ltd., Henan (CN)

( * ) Notice: Subject to any disclaimer, the term of this patent is extended or adjusted under 35 U.S.C. 154(b) by 0 days.

(21) Appl. No.: 16/858,726

(22) Filed: Apr. 27, 2020

(65) Prior Publication Data
US 2021/0088168 A1 Mar. 25, 2021

(30) Foreign Application Priority Data
Sep. 25, 2019 (CN) .......................... 201910911307.X

(51) Int. Cl.
*F16L 55/16* (2006.01)
*F16L 55/12* (2006.01)
(Continued)

(52) U.S. Cl.
CPC .......... *F16L 55/163* (2013.01); *F16L 55/124* (2013.01); *F16L 55/164* (2013.01)

(58) Field of Classification Search
CPC ...... F16L 55/163; F16L 55/124; F16L 55/164
(Continued)

(56) References Cited

U.S. PATENT DOCUMENTS 4,487,052 A * 12/1984 Yarnell ................... E03F 9/002
                                                                          72/393
4,657,436 A * 4/1987 Yarnell ..................... E03F 3/06
                                                                          138/97
(Continued)

*Primary Examiner* — Benjamin F Fiorello
*Assistant Examiner* — Edwin J Toledo-Duran

(57) ABSTRACT

The application provides a system comprising a water blocking device, a support structure, an injection machine, a resin impregnated lining hose and a light curing machine. The water blocking device blocks water and creates space for repairing. The support structure jacks up the deformation of pipelines. The injection machine injects polymer into the gap between the support structure and the HDPE pipes and the defective soil. A resin impregnated lining hose is inflated to attach to the support structure before being cured by UV lights. A CIPP (Cured-in-place pipe) liner is formed. The application carries out the trenchless rehabilitation of deformation of HDPE pipelines by integrating the method of the lining steel ring supporting, polymer injection and CIPP process. The defective soils are stabilized and further defects after repairing is avoided. The application is advantageous to the trenchless rehabilitation for double wall corrugated pipeline (diameter over 800 mm).

13 Claims, 5 Drawing Sheets

(51) Int. Cl.
*F16L 55/163* (2006.01)
*F16L 55/124* (2006.01)
*F16L 55/164* (2006.01)

(58) Field of Classification Search
USPC .............................................. 405/184–184.3
See application file for complete search history.

(56) References Cited

U.S. PATENT DOCUMENTS

| | | | | | |
|---|---|---|---|---|---|
| 4,789,268 | A | * | 12/1988 | Yarnell | ...................... E03F 3/06 |
| | | | | | 166/361 |
| 4,848,964 | A | * | 7/1989 | Yarnell | ............... F16L 55/1658 |
| | | | | | 405/184.3 |
| 4,930,542 | A | * | 6/1990 | Winkle | ..................... E21B 7/30 |
| | | | | | 138/97 |
| 9,175,798 | B1 | * | 11/2015 | Thompson | ............ F16L 55/163 |

* cited by examiner

TRENCHLESS REHABILITATION SYSTEM FOR DEFORMATION OF LARGE DIAMETER HDPE PIPELINES AND METHOD THEREOF

CROSS REFERENCE OF RELATED APPLICATION

This application claims priority under 35 U.S.C. 119(a-d) to CN 201910911307.X, filed Sep. 25, 2019.

BACKGROUND OF THE PRESENT INVENTION

Field of Invention

The present invention relates to a trenchless rehabilitation field, and more particularly to the trenchless rehabilitation system for deformation of HDPE double wall corrugated pipelines(diameter over 800 mm) and the method thereof.

Description of Related Arts

With an expanding of urban area, the underground infrastructure takes a more and more important part in residents' life. The HDPE (High-density polyethylene) double wall corrugated pipe is widely adopted in the sewerage system due to the pipe's superior physical and chemical properties. The HDPE double wall corrugated pipe is produced with high density PE (polyethylene), which is a flexible pipe. The pipe bears the load from above with the soil. The backfilling and rolling of the soil compromise the stabilization of the soil and cause eccentric compression to the HDPE pipe. When the load is too heavy for the HDPE pipe to bear the HDPE pipe will defomate and even be destroyed. The destroyed HDPE pipe disables the normal operation of the sewerage system and even induces a collapse of the ground structure.

The rehabilitation of HDPE double wall corrugated pipe is able to be carried out in a trench or trenchless way.

1. Excavation and replacement method is to dig in the soil to reach the deformed HDPE pipe and replace the pipe with a new one. The method is conventional and disrupts the surface traffic, business, and other activities, which no longer meets the needs of modem urban.

2. Trenchless rehabilitation method is a type of subsurface construction work that requires few trenches or no continuous trenches by means of steering and directional drilling. The trenchless rehabilitation is an advanced method to lay, replace and rehabilitate various underground pipelines by using rock and soil drilling machines. The trenchless rehabilitation does not disrupt the flow of traffic, destroy the environment and vegetation, interrupt the normal operation of shops, hospitals, schools and other normal activities of residents. The trenchless rehabilitation relieves disturbance to residents and reduces damage on traffic, environment and adjacent constructions caused by the dig and replacement method. The trenchless rehabilitation is cost-effective. Trenchless rehabilitation methods include pipe insertion, CIPP (Cured-in-place pipe), blasting, winding and so on, which are able to be carried out rapidly and have minimum impacts on environment. The conventional trenchless rehabilitation methods, except the blasting, are not able to repair deformation of pipelines. The pipelines are still under eccentric pressure after repairing and easily induce further defects. Although the blasting method is able to lay a new pipe on the position of the original pipe, vibrations caused by the construction impact the superstructure and adjacent pipelines significantly.

Many conventional technologies on trenchless rehabilitation are reported.

Chinese patent CN110043747A discloses a trenchless rehabilitation system and a method thereof, comprising a base, a moving assembly and a repairing assembly placed on the base. A motor is set in the repairing assembly, which drives a hose to rotate with a pillar. The system is able to repair different position inside the pipeline.

Chinese patent CN 110043747 discloses a trenchless rehabilitation technology, which uses a CCTV (Closed-Circuit Television) robot to check the leakage, displacement, block and twist in the pipeline before further repairing.

Chinese patent CN 109707949A discloses a method of trenchless rehabilitation for large diameter pipelines. The method comprises the following steps: repairing the leakage; overturning CIPP liner; sending CIPP liner into the pipeline by an overturning machine; curing the CIPP liner with unsaturated polyester resin as the adhesive; and cooling the cured CIPP liner. The pipeline is repaired.

The conventional trenchless rehabilitation method repairs the leakage or breaks on the pipelines but is not able to mend a deformed pipeline. The conventional trenchless rehabilitation method is not specially tailored for HDPE double wall corrugated pipe. A technology for repairing HDPE double wall corrugated pipe which is flexible and easily deformed is in an urgent need.

SUMMARY OF THE PRESENT INVENTION

An object of the present invention is to solve the problems of the conventional technology. The present invention discloses a trenchless rehabilitation system for deformation of large diameter HDPE pipelines and a method thereof. The invention carries out the trenchless rehabilitation of deformative pipelines by integrating the method of the lining steel ring supporting, polymer injection and CIPP process. The defective soils are stabilized and further defects after repairing is avoided. The invention is advantageous to the trenchless rehabilitation for double wall corrugated pipeline (diameter over 800 mm).

In order to carry out the rehabilitation, the present invention adopts the following technical solution.

A trenchless rehabilitation system for deformation of HDPE (High-density polyethylene) pipelines (diameter over 800 mm) comprises: a water blocking device, a support structure, an injection machine, a resin impregnated lining hose and a light curing machine;

wherein the water blocking device blocks water and creates a space for repairing the deformative pipe; the water blocking device comprises an airbag and an air compressor; the air compressor is connected to an air inlet of the airbag; the airbag is placed on an upstream access point;

wherein the support structure jacks up the deformation of pipelines; wherein the support structure comprises an upper are support steel plate, a lower arc support steel plate and a telescopic support rod; injecting holes are at a top center of the upper arc support steel plate and the lower arc support steel plate respectively; the injection machine injects polymers through the injection holes deep into the upper arc support steel plate and the lower arc support steel plate; the upper end and lower end of the telescopic support rod is fastened on the upper arc support steel plate and the lower arc support steel plate respectively by screws; the support structure further comprises a left arc support steel plate and a right arc support steel plate; spiral holes are distributed on the upper arc support steel plate, the lower arc support steel plate, the left arc support steel plate and the right arc support steel plate; adjacent arc support plates are fixed together by anchors through the spiral holes to form a lining steel ring to support the deformation of HDPE pipelines;

wherein the injection machine injects polymers in a gap between the lining steel ring and the deformation of pipeline and into defective soils;

wherein the resin impregnated lining hose expands inside the lining steel ring and attaches to the lining steel ring under air pressures;

wherein the light curing machine forms a CIPP liner by curing the resin impregnated lining hose.

Furthermore, the telescopic support rod comprises an upper fastener, an lower fastener and a telescopic piece, wherein the telescopic piece is a rod with a left-handed thread; wherein the upper fastener and the lower fastener is hollow inside with a right-handed thread matches the left-handed thread on the telescopic piece; two ends of the telescopic piece are connected to the upper and lower fastener respectively; the length of the telescopic support rod is adjusted by rotating the upper and lower fastener;

wherein the screws are set on a top of the upper fastener and a bottom of the lower fastener respectively; the screws fasten the telescopic support rod on the upper arc support steel plate and the lower arc support steel plate through the injection holes.

Furthermore, the injection machine comprises a handheld grouting gun, a grouting pipe and a grouting pump, wherein the handheld grouting gun is connected to the grouting pump by the grouting pipe; the injection machine injects the polymer to the gap between the deformation of pipelines and the lining steel ring and the defective soils outside the deformative pipelines.

The injection machine is carried by a grouting vehicle while operation.

Furthermore, the light curing machine comprises at least two UV (Ultraviolet) lights connected in series to form a UV light chain, wherein each of the UV lights connects to at least two rollers through a link on a shell of each of the UV lights; an end of the UV light chain is connected to external power through cables. The other end of the UV light chain is connected to a steel wire rope.

The UV lights are powered on by connecting to the external power and move inside the lining hose. The resin impregnated lining hose is cured and a CIPP liner is formed by the UV lights. The rollers bring the UV lights to move inside the lining hose and irradiate the lining hose. The rollers are able to reduce frictions between the light curing machine and the lining hose and guarantee a smooth movement. The rollers are connected to the UV lights through a link to maintain the UV light chain moving along the center axis of the pipelines. The UV lights are able to evenly irradiate the lining hose and the curing is carried out effectively.

Furthermore, the link is formed by several rods and screw adapters, which is telescopic and is able to be adjusted according to the size of the pipeline. The link is connected to the shell of the UV lights through an angle regulator. The length of the link and the angle between the link and the shell of the UV lights are able to be adjusted to fit the pipeline of different diameters.

Furthermore, the UV lights are rigidly connected in series; at least two rollers are connected to UV lights at two ends of the UV light chain; the rollers are connected to the shell of the UV lights by the links.

Optimally, the length of the links connected to the rollers and the angle between each of the links and the UV light chain are consistent to maintain the UV light chain moving along the center axis of the pipe and guarantee an even curing.

Optimally, three rollers are connected to each of the UV lights to form a triangle which is stable and enables the UV light chain to move smoothly and steadily in the lining hose.

A method of trenchless rehabilitation for deformation of large diameter HDPE pipelines, comprising steps of:

S1: placing an air bag on an upstream access point; filling the airbag by an air compressor to block water and create a space for a crew to enter the deformative pipelines;

S2: cleaning a deformation section on the deformative HDPE pipelines and removing obstacles;

S3: connecting a telescopic support rod to an upper arc support steel plate and a lower arc support steel plate through injection holes by fasteners to form a support structure; adjusting a length of the telescopic support rod according to a diameter of the deformative of HDPE pipelines; jacking up the deformation of HDPE pipelines by the upper arc support steel plate and the lower arc support steel plate;

S4: assembling a left arc support steel plate, a right arc support steel plate, the upper arc support steel plate and the lower arc support steel plate through spiral holes by anchors to form a lining steel ring to support the deformation of HDPE pipelines;

S5: injecting polymers deep into the upper, the lower, the left and the right arc support steel plate respectively through the injection holes and forming a first layer of polymer; wherein the first layer of polymer fills a gap between the deformation of HDPE pipelines and the lining steel ring; removing the telescopic support rod;

S6: repeating the step S5 until arc steel plates covers deformation sections of HDPE pipelines and a lining steel pipe is formed; drilling through the HDPE pipelines by a handheld drill from the injection holes on the upper arc support steel plate; injecting the polymers into the defective soil outside of HDPE pipelines by an injection machine to form a second layer of polymers to stabilize soils;

S7: pulling the injection machine out of the HDPE pipelines after the second layer of polymers are formed; pulling a resin impregnated lining hose into the HDPE pipelines by a process of CIPP; inserting the resin impregnated lining hose using air pressure; inflating the resin impregnated lining hose to tightly attach to the lining steel pipe;

S8: pulling a light curing machine into the HDPE pipelines from a first end of the HDPE pipelines; dragging the light curing machine out of the HDPE pipelines from a second end of the HDPE pipelines; curing the resin impregnated lining hose to form a tight-fitting liner; and S9: finishing the CIPP process; dragging out the light curing machine from the HDPE pipelines.

The polymers are diffusive and are able to rapidly fill the gap between the lining steel ring and the pipeline. The first layer of polymer is injected in the upper arc steel support plate and the lower arc steel support plate in the step 5. The second layer of polymer is injected through the upper arc steel support plate in the step 6 due to the pressure on the deformation of HDPE pipe is normally from above.

Furthermore, the injection machine comprises a handheld grouting gun, a grouting pipe and a grouting pump, wherein the handheld grouting gun is connected to the grouting pump by the grouting pipe;

furthermore, in the step 5, the handheld grouting gun is connected to an output end of the grouting pipe; the grouting pipe is connected to the grouting pump; wherein the handheld grouting gun is inserted into injection holes on the upper arc supporting steel plate and the lower arc supporting steel plate, the polymers is injected into the gap between the lining steel ring and the HDPE pipelines to form the first layer of polymer;

wherein the step 6 further comprises the steps of: removing the handheld grouting gun, inserting the grouting pipe directly into the defective soil from the injection holes; and injecting the polymers to form a second layer of polymer to stabilize the soil.

The gap between the lining steel ring and the HDPE pipe is narrow, so a handheld grouting gun is adopted in the step 5. The space between the defective soils and the HDPE pipeline is wide and the grouting pipe is inserted directly into the defective soils in the step 6.

Furthermore, the light curing machine comprises at least two UV lights connected in series to form a UV light chain, wherein each of the UV lights connects to at least two rollers through a link on a shell of each of the UV lights; a first end of the UV light chain is connected to external power through cables; a second end of the UV light chain is connected to a steel wire rope for dragging the UV light chain along the HDPE pipelines to cure the resin impregnated lining hose;

Furthermore, the step 8 further comprises the following steps: pulling the light curing machine into the HDPE pipelines from the first end; moving the UV light chain along the resin impregnated lining hose for curing; dragging the light curing machine out of the HDPE pipelines from the second end; and curing the resin impregnated lining hose to form the tight-fitting liner and attach to the lining steel pipe by the process of CIPP before dragging the light curing machine out of the HDPE pipelines.

A few guidelines need to be emphasized during operation.

In the step 6, the handheld drill is held straight and perpendicular to the upper arc steel plate to avoid a skew which compromise an effective polymer injection.

In the step 7, a thin pad is laid on and is fixed at two ends of the HDPE pipelines before pulling the resin impregnated lining hose into the HDPE pipelines to prevent the resin impregnated lining hose from being scratched.

In the step 8, an air compressor is adopted to inflate the liner. The pressure applied must to be checked by a pressure gauge and a control device to comply with the pre-set value.

Compared to the conventional technology, the present invention has the following benefits.

The present invention provides a trenchless rehabilitation system for deformation of HDPE pipelines(diameter over 800 mm), comprising: a water blocking device, a support structure, an injection machine, a resin impregnated lining hose and a light curing machine; wherein the water blocking device blocks water and creates a space for repairing the deformation of pipe; the support structure jacks up the deformation of HDPE pipelines; the injection machine injects polymers into the support structure and the defective soils; the resin impregnated lining hose is pulled in the HDPE pipeline and inflated by air to tightly-fitting the lining steel pipe; curing the resin impregnated lining hose by the light curing machine to form a CIPP liner.

The present invention integrates the method of the lining steel ring supporting, polymer injection and CIPP process, which is able to repair the deformation of HDPE pipelines (diameter over 800 mm) without excavation. The present invention is able to repair the deformation of double wall corrugated HDPE pipeline and stabilize the defective soil at the same time to prevent further defects. The present invention is specially tailored for repairing the deformative double wall corrugated HDPE pipeline(diameter over 800 mm).

The present invention relates to an overturning CIPP method. A polymer felt resin impregnated lining hose clings to the HDPE pipelines under the pressure of water or air. The resin impregnated lining hose closely clings to the lining steel pipe by special glue and the original pipeline is repaired. The material of the liner does not react with the conveying medium. The resin impregnated lining hose choose high intensity polyester composite polymer felt and high intensity unsaturated polyester resin produced by a German company Insiduform®.

BRIEF DESCRIPTION OF THE DRAWINGS

In order to better illustrate the embodiments of the present invention or the conventional technology, the figures required are described below. The figures illustrate part of the embodiments of the present invention. The skilled in the field may develop other figures without innovation.

Element numbers: first layer of polymer—1; second layer of polymer—2; lining steel pipe—3; upper arc steel plate—301; lower arc steel plate—302; left arc steel plate—303; right arc steel plate—304; telescopic support rod—4; upper fastener—401; lower fastener—402; telescopic piece—403; screw—5; grouting pipe—6; grouting pump—7; air bag—8; anchor—15; resin impregnated lining hose—9; UV light—11; roller—10; cable—12; injection hole—12: handheld grouting gun—14; air compressor—16; link—17.

DETAILED DESCRIPTION OF THE PREFERRED EMBODIMENT

The present invention is further illustrated by the following embodiments. The embodiments are for a better and clear description of the present invention, which are only part of the present invention and is not a limitation of the present invention.

The terminologies such as 'center', 'upper'. 'lower', 'left', 'right', 'vertical', 'horizontal', 'inside', 'outside' and so on are just an indication of the positions based on the figures, which conveniently describe the present invention with simple words and do not define the way the device or elements are connected and operated. The terminologies are not a limitation to the present invention. The terminologies such as 'first', 'second' and 'third' are for better description of the present invention, which are irrelevant to the degree of importance.

The terminologies such as 'set', 'assemble', 'connect', and 'link' do not limited in a specific way except being explained and defined otherwise. The word 'connect' is able to be explained as being fixed together, detachable connection, integrated together, mechanical connection, electric connection, direct connection, indirect connection or internal connection inside two elements. The skilled in the field is able to perceive the meaning of the word according to different situations.

Embodiment 1

Figure 1:
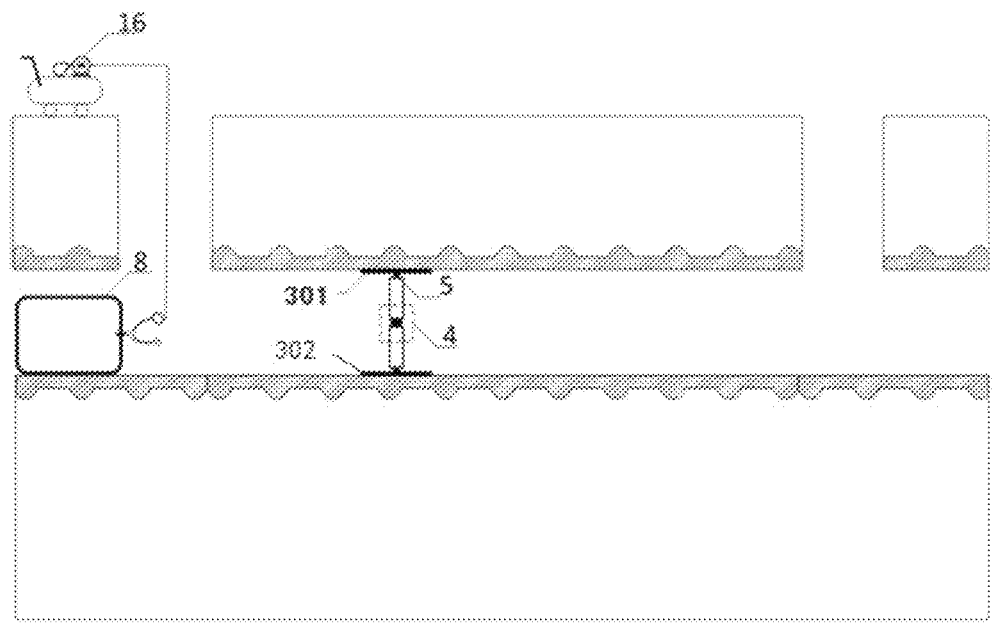
FIG. 1 is a longitudinal section view of an airbag and a support structure (without left and right arc steel plate)
Figure 2:
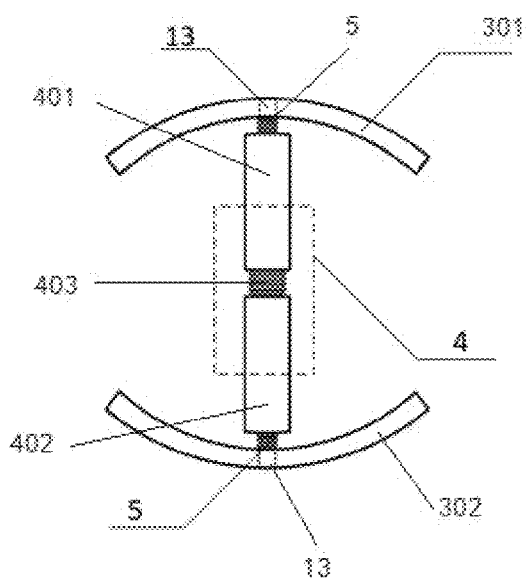
FIG. 2 illustrates part of the support structure (without left and right arc steel plate)
Figure 3:
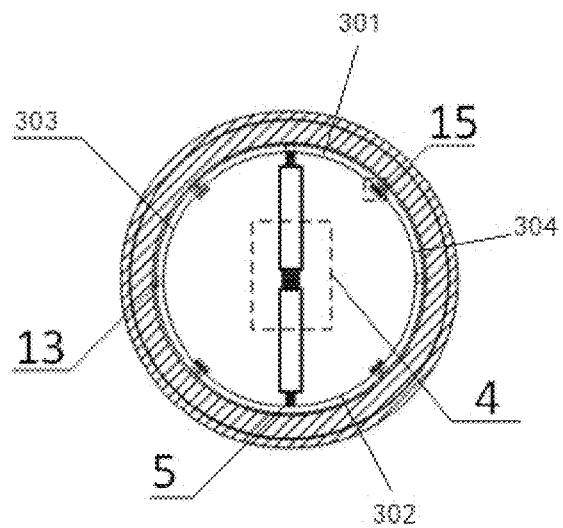
FIG. 3 is a cross section view of the support structure inside pipelines.
Figure 4:
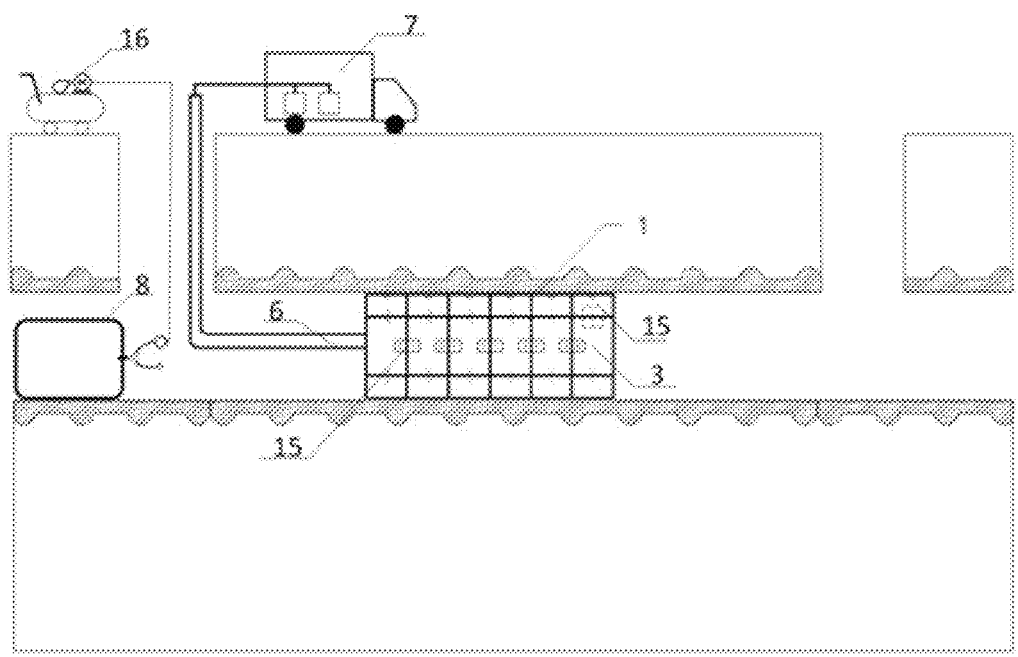
FIG. 4 is a longitudinal section view of a lining steel pipe assembled by multiple lining steel rings inside the pipelines.
Figure 5:
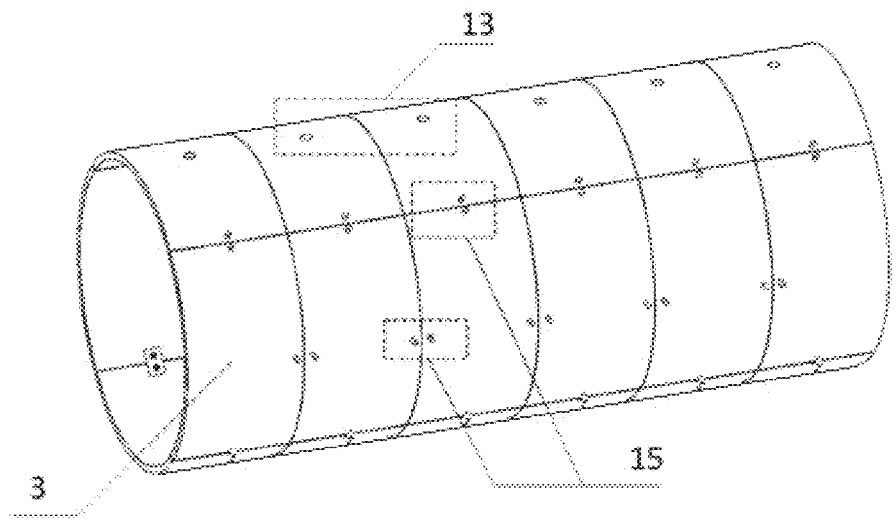
FIG. 5 is a perspective view of the lining steel pipe.
Figure 6:
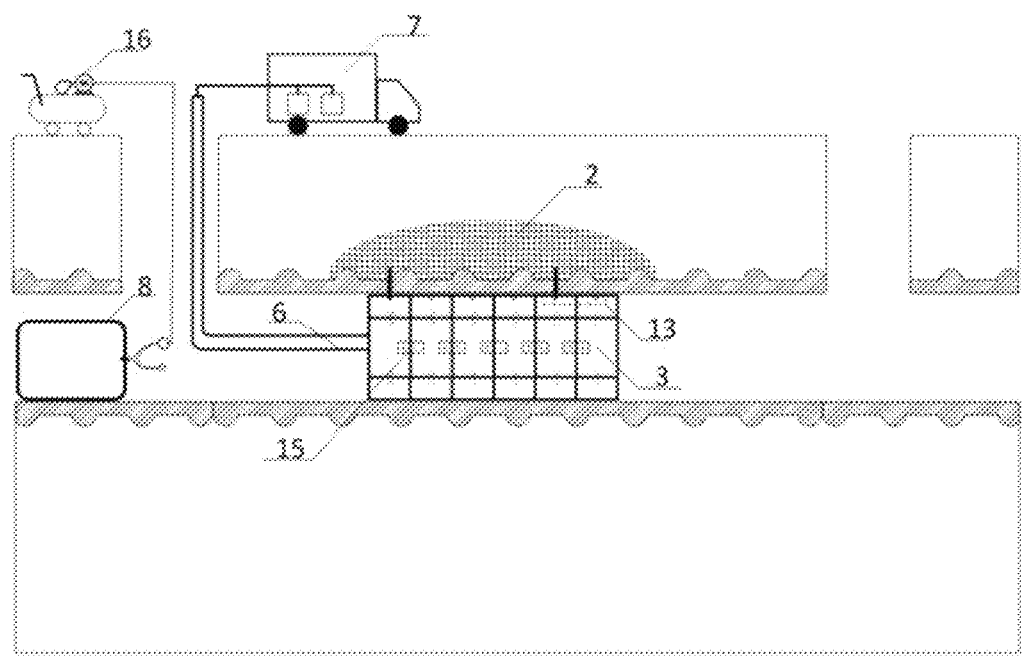
FIG. 6 is a longitudinal section view of polymer injection into defective soils out of the pipelines.
Figure 7:
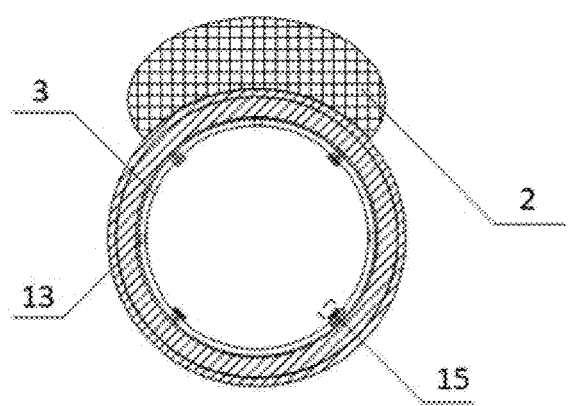
FIG. 7 is a cross section view of the lining steel ring and the polymer injection.
Figure 8:
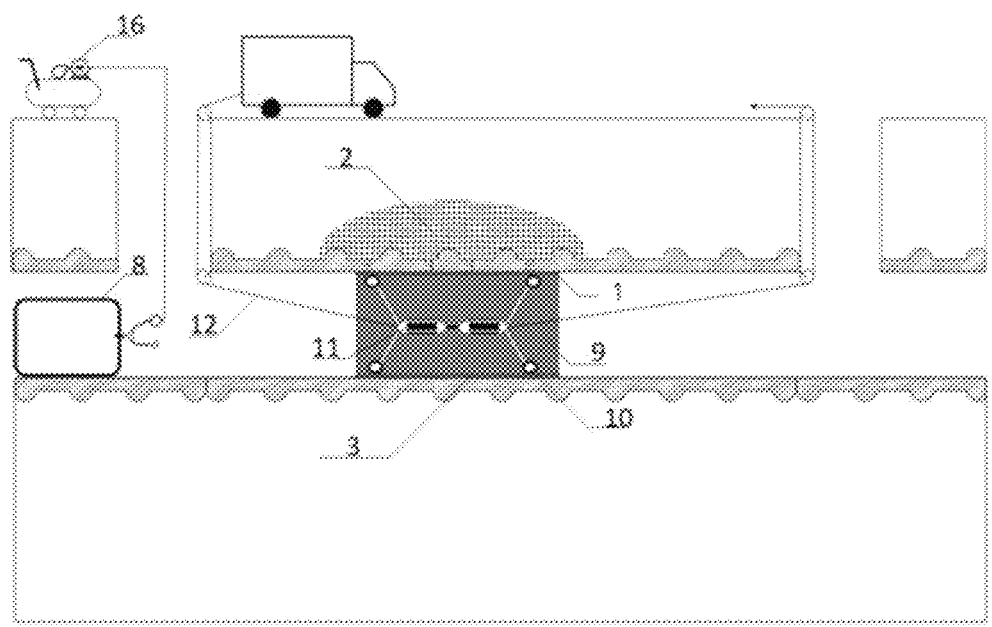
FIG. 8 is longitudinal section view of CIPP rehabilitation by light.
Figure 9:
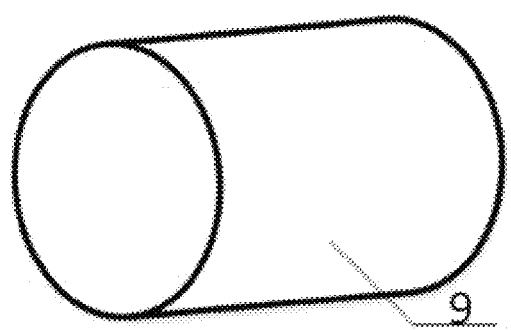
FIG. 9 is a perspective view of a resin impregnated lining hose.
Figure 10:
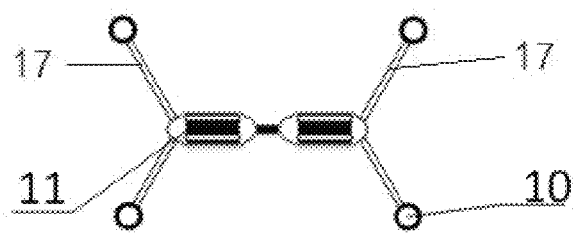
FIG. 10 is a perspective view of the light curing machine.

Referring to FIG. 1 to FIG. 9, the present invention provides a trenchless rehabilitation system for HDPE double wall corrugated pipe(diameter over 800 mm), comprising: a water blocking device, a support structure, an injection machine, a resin impregnated lining hose and a light curing machine;

wherein the water blocking device blocks water and creates a space for repairing the deformative pipes: the water blocking device comprises an airbag 8 and an air compressor 16: the air compressor 16 is connected to an air inlet of the airbag 8: the airbag 8 is placed on an upstream access point:

the support structure jacks up the deformation of pipelines; wherein the support structure comprises an upper arc support steel plate 301, a lower arc support steel plate 302 and a telescopic support rod 4: injecting holes 13 are at a top center of the upper arc support steel plate 301 and the lower arc support steel plate 302 respectively; the injection machine injects polymer through the injection holes 13 deep into the upper arc support steel plate 301 and the lower arc support steel plate 302; the upper end and lower end of the telescopic support rod 4 is fastened on the upper arc support steel plate 301 and the lower arc support steel plate 302 respectively by screws 5; optimally, the telescopic support rod 4 comprises an upper fastener 401, an lower fastener 402 and a telescopic piece 403, wherein the telescopic piece 403 is a rod with left-handed thread; wherein the upper fastener 401 and the lower fastener 402 is hollow inside with a right-handed thread matches the left-handed thread on the telescopic piece; two ends of the telescopic piece 403 are connected to the upper fastener 401 and lower fastener 402 respectively; the length of the telescopic support rod 4 is adjusted by rotating the upper and lower fastener; the screws 5 is set on a top end of the upper fastener 401 and an bottom end of the lower fastener 402; the screws 5 matches the injection holes 13 to connect the telescopic support rod 4 with the upper arc support steel plate 301 and the lower arc support steel plate 302.

The support structure further comprises a left arc support steel plate 303 and a right arc support steel plate 304: spiral holes are distributed on the upper arc support steel plate 301, the lower arc support steel plate 302, the left arc support steel plate 303 and the right arc support steel plate 304, adjacent arc support plates are fixed together by anchors 15 through the spiral holes to form a lining steel ring 3 to support the deformation of HDPE pipelines.

The injection machine injects polymers in a gap between the lining steel ring and the deformation of pipelines and into defective soils through injection holes 13. In this embodiment, the injection machine comprises a handheld grouting gun 14, a grouting pipe 6 and a grouting pump 7, wherein the handheld grouting gun 14 is connected to the grouting pump 7 by the grouting pipe 6; the injection machine injects the polymers to the gap between the deformation of pipelines and the lining steel ring and the defective soils outside the deformative pipelines through injection holes 13.

The resin impregnated lining hose 9 expands inside the lining steel ring and attaches to the lining steel ring under air pressures. The resin impregnated lining hose 9 choose high intensity polyester composite polymer felt and high intensity unsaturated polyester resin produced by a German company Insiduform®.

The light curing machine forms a CIPP (Cured-in-place pipe) liner by curing the resin impregnated lining hose 9. The light curing machine comprises at least two UV (Ultraviolet) lights 11 connected in series to form a UV light chain, wherein each of the UV lights 11 connects to at least two rollers 10 through a link 17 on a shell of each of the UV lights 11: a first end of the UV light chain is connected to external power through cables; a second end of the UV light chain is connected to a steel wire rope.

The UV lights 11 are powered on by connecting to the external power with the cable 12 and move inside the lining hose 9. The resin impregnated lining hose 9 is cured and a CIPP liner is formed by the UV lights 11. The rollers 10 bring the UV lights 11 to move inside and irradiate the lining hose 9. The rollers 10 are able to reduce frictions between the light curing machine and the lining hose 9 and guarantee a smooth movement. The rollers 10 are connected to the UV lights 11 through a link 17 to maintain the UV light chain moving along the center axis of the pipelines. The UV lights 11 are able to evenly irradiate the lining hose 9 and the curing is carried out effectively.

The link 17 is formed by several rods and screw adapters, which is telescopic and is able to be adjusted according to the size of the pipeline. The link 17 is connected to the shell of the UV lights 11 through an angle regulator. The length of the link 17 and the angle between the link 17 and the shell of the UV lights 11 are able to be adjusted to fit the pipeline of different diameters.

The UV lights 11 are rigidly connected in series; at least two rollers 10 are connected to UV lights 11 at two ends of the UV light chain; the rollers 10 are connected to the shell of the UV lights 11 by the link 17.

the length of the links 17 connected to the rollers 10 and the angle between each of the links 17 and the UV light chain are consistent to maintain the UV light chain moving along the center axis of the pipe and guarantee an even curing.

Two UV lights 11 are adopted in this embodiment. Two links 17 are on the shell of each of the UV lights 11. Two rollers 10 are on two links 17 respectively.

Optimally, three rollers 10 are connected to each of the UV lights 11 to form a triangle which is stable and enables the UV light chain to move smoothly and steadily in the lining hose.

Embodiment 2

The present embodiment provides a method adopts the above mentioned trenchless rehabilitation system for HDPE pipelines over 800 mm, comprising the following steps:

S1: placing an air bag 8 on an upstream access point; filling the airbag by an air compressor 16 to block water and create a space for a crew to enter the HDPE pipelines;

S2: cleaning a deformation section on the deformative HDPE pipelines and removing obstacles:

S3: connecting a telescopic support rod 4 to an upper arc support steel plate 301 and a lower arc support steel plate 302 through injection holes 13 by screws 5 to form a support structure; adjusting a length of the telescopic support rod 4 according to a diameter of the deformative HDPE pipelines;

jacking up the deformative HDPE pipelines by the upper arc support steel plate 301 and the lower arc support steel plate 302;

specifically, choosing a threaded rod according to the diameter of the pipeline as the telescopic piece 403; choosing the upper fastener 401 and the lower fastener 402 to match the telescopic piece 403; mounting the upper fastener 401 and the lower fastener 402 on two ends of the telescopic piece 403 to assemble the telescopic support rod 4; fixing a first end of the telescopic support rod 4 to the corresponding arc steel plate through the injection holes 13; adjusting the length of the telescopic rod 4 to fix a second end of the telescopic support rod 4 to the corresponding arc steel plate through injection holes 13; adjusting the length of the telescopic support rod 4 until the deformation of pipelines is jacked up;

S4: assembling a left arc support steel plate 303, a right arc support steel plate 304, the upper arc support steel plate 301 and the lower arc support steel plate 302 through spiral holes by anchors 15 to form a lining steel pipe 3 and support the deformation of HDPE pipelines;

S5: injecting polymers deep into the upper, the lower, the left and the right arc support steel plate respectively through the injection holes 13 by the injecting machine and forming a first layer of polymer 1: wherein the first layer of polymer fills a gap between the deformation of HDPE pipelines and the lining steel ring 3; removing the telescopic support rod 4:

S6: repeating the step S5 until arc steel plates covers deformative sections of HDPE pipelines and a lining steel pipe 3 is formed; drilling through the HDPE pipelines by a handheld drill from the injection holes 13 on the upper arc support steel plate 301; taking off the grouting gun 14; inserting the grouting pipe 6 polymers directly into the defective soils outside of HDPE pipelines; stating the injection machine to form a second layer of polymers 2 to stabilize soils;

the gap between the lining steel ring and the HDPE pipe is narrow, so a handheld grouting gun 14 is adopted in the step 5. The space between the defective soils and the HDPE pipeline is wide and the grouting pipe 6 is inserted directly into the defective soils in the step 6: the polymers are diffusive and are able to rapidly fill the gap between the lining steel ring and the pipeline. The first layer of polymer 1 is injected in the upper arc steel support plate 301 and the lower arc steel support plate 302 in the step 5; the second layer of polymer 2 is injected through the upper arc steel support plate 301 in the step 6 due to the pressure on the deformative HDPE pipe is normally from above.

S7: pulling the injection machine out of the HDPE pipelines after the second layer of polymer 2 are formed; pulling a resin impregnated lining hose 9 into the HDPE pipelines by a process of CIPP; inserting the resin impregnated lining hose 9 using air pressure; inflating the resin impregnated lining hose 9 to tightly attach to the lining steel pipe 3;

S8: pulling a light curing machine into the HDPE pipelines from a first end of the HDPE pipelines; dragging the light curing machine out of the HDPE pipelines from a second end of the HDPE pipelines; the UV light chain with two UV lights 11 connected in series on rollers 10 dragged by cable 12 moves and irradiates the resin impregnated lining hose 9; curing the resin impregnated lining hose 9 to form a tight-fitting liner; and S9: finishing the CIPP process; dragging out the light curing machine from the HDPE pipelines.

A few guidelines need to be emphasized during operation.

In the step 6, the handheld drill is held straight and perpendicular to the upper arc steel plate to avoid a skew which compromise an effective polymer injection.

In the step 7, a thin pad is laid on and is fixed at two ends of the HDPE pipelines before pulling the resin impregnated lining hose 9 into the HDPE pipelines to prevent the resin impregnated lining hose from being scratched.

In the step 8, an air compressor is adopted to inflate the liner 9. The pressure applied must to be checked by a pressure gauge and a control device to comply with the pre-set value.

The present invention integrates the method of the lining steel ring supporting, polymer injection and CIPP process, which is able to repair the deformative HDPE pipelines (diameter over 800 mm) without excavation. The present invention is able to repair the deformation of double wall corrugated HDPE pipeline and stabilize the defective soils at the same time to prevent further defects. The present invention is specially tailored for repairing the deformation of double wall corrugated HDPE pipeline (diameter over 800 mm).

The embodiments are not limitations for the present invention. Replacements and alterations developed by skilled in the art are within the protective scope of the present invention.

What is claimed is:

1. A trenchless rehabilitation system for deformation of large diameter HDPE (high-density polyethylene) pipelines, comprising: a water blocking device, a support structure, an injection machine, a resin impregnated lining hose and a light curing machine;

wherein the water blocking device blocks water and creates a space for repairing the deformation of the large diameter HDPE pipeline; the water blocking device comprises an airbag and an air compressor; the air compressor is connected to an air inlet of the airbag; the airbag is placed on an upstream access point;

wherein the support structure jacks up the deformation of the large diameter HDPE pipeline; wherein the support structure comprises an upper arc support steel plate, a lower arc support steel plate and a telescopic support rod; injecting holes are at a top center of the upper arc support steel plate and the lower arc support steel plate respectively; the injection machine injects polymer through the injection holes deep into the upper arc support steel plate and the lower arc support steel plate; an upper end and a lower end of the telescopic support rod is fastened on the upper arc support steel plate and the lower arc support steel plate respectively by screws; the support structure further comprises a left arc support steel plate and a right arc support steel plate; spiral holes are distributed on the upper arc support steel plate, the lower arc support steel plate, the left arc support steel plate and the right arc support steel plate; adjacent arc support plates are fixed together by anchors through the spiral holes to form a lining steel ring to support the deformation of HDPE pipelines;

wherein the injection machine injects polymers in a gap between the lining steel ring and the deformation of pipeline and into defective soils through injection holes;

wherein the resin impregnated lining hose expands inside the lining steel ring and clings to the lining steel ring under air pressures;

wherein the light curing machine forms a CIPP (cured-in-place pipe) liner by curing the resin impregnated lining hose.

2. The trenchless rehabilitation system for the deformation of the large diameter HDPE pipelines, as recited in claim 1, wherein the telescopic support rod comprises an upper fastener, an lower fastener and a telescopic piece, wherein the telescopic piece is a rod with a left-handed thread; wherein the upper fastener and the lower fastener is hollow inside with a right-handed thread matches the left-handed thread on the telescopic piece; two ends of the telescopic piece are connected to the upper and lower fastener respectively; a length of the telescopic support rod is adjusted by rotating the upper and lower fastener;

wherein the screws are set on a top of the upper fastener and a bottom of the lower fastener respectively; the screws fasten the telescopic support rod on the upper arc support steel plate and the lower arc support steel plate through the injection holes.

3. The trenchless rehabilitation system for the deformation of the large diameter HDPE pipelines, as recited in claim 1, wherein the injection machine comprises a handheld grouting gun, a grouting pipe and a grouting pump, wherein the handheld grouting gun is connected to the grouting pump by the grouting pipe; the injection machine injects the polymers to the gap between the deformation of the large diameter HDPE pipeline and the lining steel ring and the defective soils outside the deformation of the large diameter HDPE pipeline through the injection holes.

4. The trenchless rehabilitation system for the deformation of the large diameter HDPE pipelines, as recited in claim 2, wherein the injection machine comprises a handheld grouting gun, a grouting pipe and a grouting pump, wherein the handheld grouting gun is connected to the grouting pump by the grouting pipe; the injection machine injects the polymers to the gap between the deformation of the large diameter HDPE pipeline and the lining steel ring and the defective soils outside the deformed HDPE pipelines through the injection holes.

5. The trenchless rehabilitation system for the deformation of large diameter HDPE pipelines, as recited in claim 1, wherein the light curing machine comprises at least two UV (ultraviolet) lights connected in series to form a UV light chain, wherein each of the UV lights connects to at least two rollers through a link on a shell of each of the UV lights; a first end of the UV light chain is connected to an external power through cables; a second end of the UV light chain is connected to a steel wire rope.

6. The trenchless rehabilitation system for the deformation of the large diameter HDPE pipelines, as recited in claim 2, wherein the light curing machine comprises at least two UV (Ultraviolet) lights connected in series to form a UV light chain, wherein each of the UV lights connects to at least two rollers through a link on a shell of each of the UV lights; a first end of the UV light chain is connected to an external power through cables; a second end of the UV light chain is connected to a steel wire rope.

7. The trenchless rehabilitation system for the deformation of the large diameter HDPE pipelines, as recited in claim 5, wherein the link is formed by several rods and screw adapters; the link is connected to the shell of the UV lights through an angle regulator.

8. The trenchless rehabilitation system for the deformation of the large diameter HDPE pipelines, as recited in claim 6, wherein the link is formed by several rods and screw adapters; the link is connected to the shell of the UV lights through an angle regulator.

9. The trenchless rehabilitation system for the deformation of the large diameter HDPE pipelines, as recited in claim 7, wherein the UV lights are rigidly connected in series; at least two rollers are connected to UV lights at two ends of the UV light chain; the rollers are connected to the shell of the UV lights by the link.

10. The trenchless rehabilitation system for the deformation of the large diameter HDPE pipelines, as recited in claim 8, wherein the UV lights are rigidly connected in series; at least two rollers are connected to UV lights at two ends of the UV light chain; the rollers are connected to the shell of the UV lights by the link.

11. A method of trenchless rehabilitation for deformation of large diameter HDPE pipelines, comprising steps of:
S1: placing an air bag on an upstream access point; filling the airbag by an air compressor to block water and create a space for a crew to enter the deformed HDPE pipeline;
S2: cleaning a deformed section on the HDPE pipelines and removing obstacles;
S3: connecting a telescopic support rod to an upper arc support steel plate and a lower arc support steel plate through injection holes by screws to form a support structure; adjusting a length of the telescopic support rod according to a diameter of the deformed HDPE pipeline; jacking up the deformed HDPE pipeline by the upper arc support steel plate and the lower arc support steel plate;
S4: assembling a left arc support steel plate, a right arc support steel plate, the upper arc support steel plate and the lower arc support steel plate through spiral holes by anchors to form a lining steel ring to support the deformation of HDPE pipelines;
S5: injecting polymers deep into the upper, the lower, the left and the right arc support steel plate respectively through the injection holes and forming a first layer of polymer; wherein the first layer of polymer fills a gap between the deformation of HDPE pipelines and the lining steel ring; removing the telescopic support rod;
S6: repeating the step S5 until arc steel plates covers deformed sections of HDPE pipelines and a lining steel pipe is formed; drilling through the HDPE pipelines by a handheld drill from the injection holes on the upper arc support steel plate; injecting the polymers into defective soils outside of HDPE pipelines by an injection machine to form a second layer of polymers to stabilize soils;
S7: pulling the injection machine out of the HDPE pipelines after the second layer of polymers are formed; pulling a resin impregnated lining hose into the HDPE pipelines by a process of CIPP; inserting the resin impregnated lining hose using air pressure; inflating the resin impregnated lining hose to tightly attach to the lining steel pipe;
S8: pulling a light curing machine into the HDPE pipelines from a first end of the HDPE pipelines; dragging the light curing machine out of the HDPE pipelines from a second end of the HDPE pipelines; curing the resin impregnated lining hose to form a tight-fitting CIPP liner; and
S9: finishing the CIPP process; dragging out the light curing machine from the HDPE pipelines.

12. The method of the trenchless rehabilitation for the deformation of the large diameter HDPE pipelines, as recited in claim 11, wherein the injection machine comprises a handheld grouting gun, a grouting pipe and a grouting pump, wherein the handheld grouting gun is connected to the grouting pump by the grouting pipe;
furthermore, in the step 5, the handheld grouting gun is connected to an output end of the grouting pipe; the grouting pipe is connected to the grouting pump; wherein the handheld grouting gun is inserted into injection holes on the upper arc supporting steel plate and the lower arc supporting steel plate; the polymers is injected into the gap between the lining steel ring and the HDPE pipelines to form the first layer of polymer, wherein the step 6 further comprises the steps of: removing the handheld grouting gun, inserting the grouting pipe directly into the defective soils from the injection holes; and injecting the polymers to form the second layer of polymer.

13. The method of trenchless rehabilitation for the deformation of the large diameter HDPE pipelines, as recited in claim 12 wherein the light curing machine comprises at least two UV (ultraviolet) lights connected in series to form a UV light chain, wherein each of the UV lights connects to at least two rollers through a link on a shell of each of the UV lights; a first end of the UV light chain is connected to external power through cables; a second end of the UV light chain is connected to a steel wire rope for dragging the UV light chain along the HDPE pipelines to cure the resin impregnated lining hose;

wherein the step 8 further comprises the following steps: pulling the light curing machine into the HDPE pipelines from the first end of the HDPE pipelines; moving the UV light chain along the resin impregnated lining hose for curing; dragging the light curing machine out of the HDPE pipelines from the second end of the HDPE pipelines; and curing the resin impregnated lining hose to form the tight-fitting liner and attach to the lining steel pipe by the process of CIPP before dragging the light curing machine out of the HDPE pipelines.

* * * * *